United States Patent
Shin (10) Patent No.: US 7,751,670 B2
(45) Date of Patent: Jul. 6, 2010

(54) LASER DISPLAY DEVICE AND OPTICAL COUPLER THEREFOR

(75) Inventor: Sung Chul Shin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 11/711,904

(22) Filed: Feb. 28, 2007

(65) Prior Publication Data
US 2007/0201800 A1   Aug. 30, 2007

(30) Foreign Application Priority Data

| Feb. 28, 2006 | (KR) | .................. 10-2006-0019524 |
| Mar. 15, 2006 | (KR) | .................. 10-2006-0024014 |

(51) Int. Cl.
*G02B 6/00*   (2006.01)
*G03B 21/14*  (2006.01)

(52) U.S. Cl. ........................ 385/133; 385/901; 353/84; 353/122; 362/551

(58) Field of Classification Search ................ 385/115, 385/31, 133, 901; 353/84.122
See application file for complete search history.

(56) References Cited

U.S. PATENT DOCUMENTS

| 4,360,372 | A * | 11/1982 | Maciejko ................... 65/402 |
| 6,874,893 | B2 * | 4/2005 | Park ............................ 353/84 |
| 7,202,466 | B2 * | 4/2007 | Babayoff et al. ........... 250/216 |
| 7,585,078 | B2 * | 9/2009 | Kim et al. .................... 353/82 |
| 2002/0126479 | A1 * | 9/2002 | Zhai et al. ................... 362/244 |
| 2004/0165827 | A1 * | 8/2004 | Bruesselbach et al. ....... 385/46 |

OTHER PUBLICATIONS

Lowenthal et al., Speckle Removal by a Slowly Moving Diffuser Associated with a Motionless Diffuser, Jul. 1971, Journal of the Optical Society of America, vol. 61 No. 7, pp. 847-851.*

* cited by examiner

*Primary Examiner*—Sarah Song
(74) *Attorney, Agent, or Firm*—McKenna Long & Aldridge LLP

(57) ABSTRACT

A laser display device, which eliminates speckles generated in the transmission of laser beams and uniformly mixes laser beams of various colors, and an optical coupler therefor. The laser display device includes light sources emitting laser beams; an image display unit displaying an image by the laser beams; and a speckle elimination unit located on a path of the laser beams, and including at least one panel having an uneven part and disposed on an optical axis of the light sources.

10 Claims, 10 Drawing Sheets

LASER DISPLAY DEVICE AND OPTICAL COUPLER THEREFOR

This application claims the benefit of Korean Patent Application No. 10-2006-0019524, filed Feb. 28, 2006 and Korean Patent Application No. 10-2006-0024014, filed Mar. 15, 2006, which are hereby incorporated by references as if fully set forth herein.

BACKGROUND OF THE INVENTION

1. Field of the Invention

The present invention relates to a laser display device and an optical coupler therefor, and more particularly, to a laser display device, which eliminates speckles generated in the transmission of laser beams and uniformly mixes laser beams of various colors, and an optical coupler therefor.

2. Discussion of the Related Art

Recently, display devices using various light sources have been manufactured. Among various light sources, a laser light source has a wide color temperature, and is advantageous in that a displayed image are expressed in colors, which are close to natural colors, thus trying to be applied to a display field.

However, when the laser light source is used in display devices, speckles occur due to the coherence of laser beams in that the laser beams have the same special and temporal phases.

When light having coherence, such as a laser beam, is reflected by the surface of an object, the light is dispersed due to the roughness of the surface. In case that a detector has a limited aperture (for example, a human eye) sees the light, speckles are detected by the detector.

That is, speckles differ from spots, which occur due to a variation of image or beam intensity distribution by defects of an optical system passing laser beams.

Accordingly, in order to manufacture a high definition display device having excellent color reproduction and color purity, speckle noise must be reduced.

SUMMARY OF THE INVENTION

Accordingly, the present invention is directed to a laser display device and an optical coupler therefor.

One object of the present invention is to provide a laser display device, which eliminates speckles, i.e., an interference fringe of laser light, without affecting the construction of the display device or light transmittance, thus displaying a clear image.

Another object of the present invention is to provide an optical coupler, which uniformly mixes laser beams while reducing speckle noise generated due to the coherence of the laser beams, and simplifies the structure of a laser display device.

To achieve this object and other advantages and in accordance with the purpose of the invention, as embodied and broadly described herein, an optical coupler comprises at least one first coupling unit provided with a guide hole, through which an external beam is incident on the first coupling unit, and filled with an optical transmission medium; and a second coupling unit coupled with the first coupling unit so that the optical transmission medium of the first coupling unit forms one section.

In another aspect of the present invention, a laser display device comprises light sources emitting laser beams; an image display unit displaying an image by the laser beams; and a speckle elimination unit located on a path of the laser beams, and including at least one panel having an uneven part and disposed on an optical axis of the light sources.

In yet another aspect of the present invention, a laser display device comprises light sources generating laser beams; an optical path unit including a speckle elimination unit on an incident plane thereof, and uniformly mixing the laser beams; and an image display unit for displaying an image by the laser beams output from the optical path unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1 to 4 illustrate a first embodiment of the prevent invention, and more specifically:

FIGS. 5 to 8 illustrate a second embodiment of the prevent invention, and more specifically:

FIGS. 9 to 14 illustrate a third embodiment of the prevent invention, and more specifically:

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1:
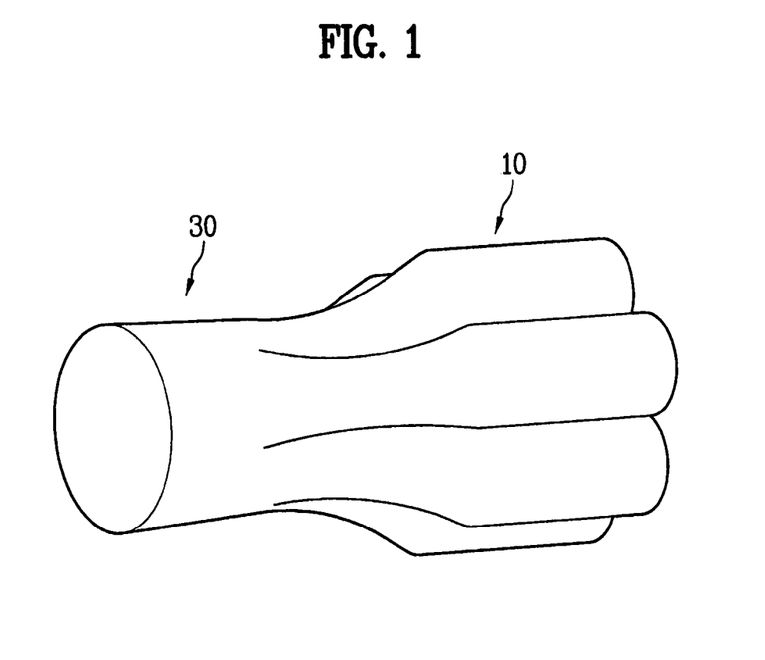
FIG. 1 is a perspective view of one side of one embodiment of an optical coupler in accordance with the present invention.
Figure 2:
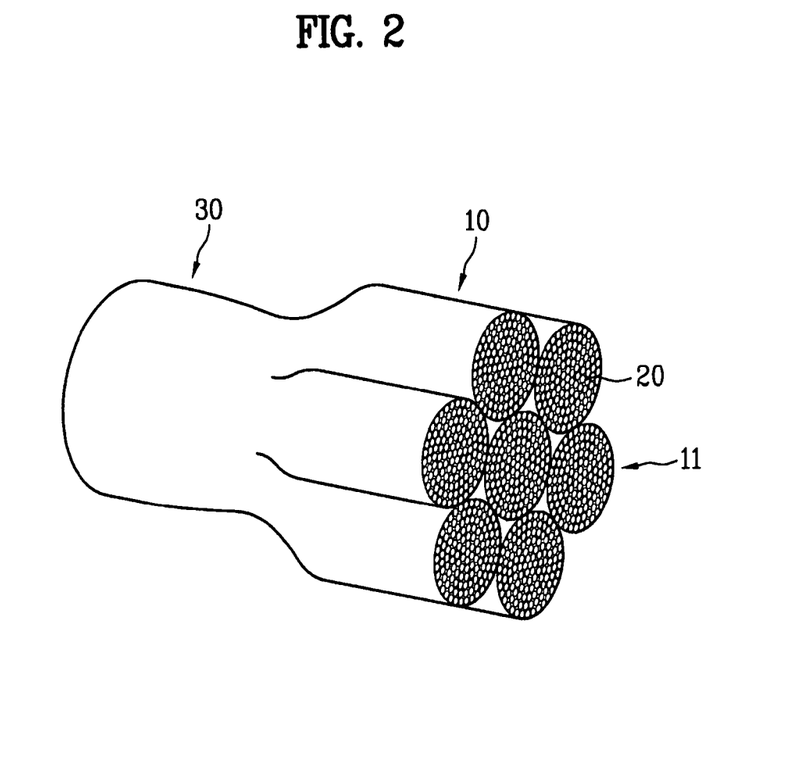
FIG. 2 is a perspective view of the other side of one embodiment of the optical coupler in accordance with the present invention.

FIGS. 1 and 2 are perspective views illustrating one embodiment of an optical coupler in accordance with the present invention. With reference to FIGS. 1 and 2, an optical coupler includes first coupling units 10 and a second coupling unit 30. A guide hole 11, through which an external beam is incident on each of the first coupling units 10, is formed through each of the first coupling units 10.

The first coupling units 10 and the second coupling unit 30 are filled with an optical transmission medium 20.

Further, as shown in FIGS. 1 and 2, the first coupling units 10 are provided in a plural number, and beams of different colors are incident on the first coupling units 10 through the guide holes 11, are combined through the optical coupler, and are discharged to the second coupling unit 30.

Particularly, the coherence of laser beams is lowered using the optical coupler.

Preferably, laser beams of three primary colors of light, i.e., red, green, and blue, are incident on the first coupling units 10 through the guide holes 11, and are combined to form white light, and the white light is output to the second coupling unit 30. Here, as described above, coherence is lowered, and speckle noise of the laser beams is reduced.

The optical transmission medium 20 uses a plurality of optical fibers. Particularly, the optical transmission medium 20 uses a plurality of optical fibers without a cladding.

The plurality of optical fibers is located in the first coupling units 10 under the condition that they are thermally twisted. The coherence of the laser beams, which are incident on the first coupling units 10 through the guide holes 11, is primarily lowered by the first coupling units 10.

The plurality of optical fibers, which is thermally twisted in the first coupling units 10, is combined in the second coupling unit 30, and is secondarily thermally twisted in the second coupling unit 30, thus forming one section.

Thereby, the coherence of the laser beams, which was primarily lowered through the first coupling units 10, is secondarily lowered through the second coupling unit 30 and is discharged.

Figure 3:
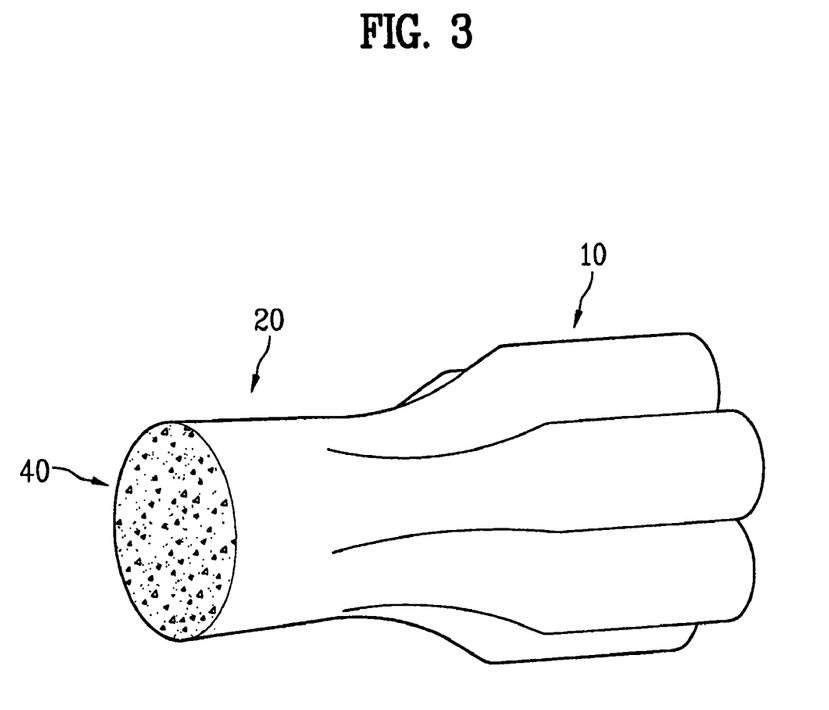
FIG. 3 is a perspective view of another embodiment of the optical coupler in accordance with the present invention.

As shown in FIG. 3, a diffuser 40 is provided on the outer surface of the second coupling unit 30, thus completely eliminating the coherence of laser beams.

The diffuser 40 may use any optical element, which makes the phase of light irregular. Preferably, the diffuser 40 uses a random phase plate (RPP).

Here, the diffuser 40 may be separately prepared and be attached to the second coupling unit 30. Preferably, the diffuser 40 is formed on the outer surface of the second coupling unit 30.

That is, the diffuser 40 is obtained by forming a diffuser layer on the outer surface of the second coupling unit 30 and patterning the diffuser layer so as to have an irregular pattern.

The diffuser layer is made of a polymeric material and is patterned by etching, thus forming the diffuser 40.

Preferably, the above optical coupler is used in an optical path of a laser display device so as to eliminate the coherence of optical beams.

Laser display devices using laser light are divided into micro display panel type laser display devices and scan type laser devices. A micro display panel type device requires a rod lens and a beam combiner for uniformly mixing beams. However, a laser display device using the above-described optical coupler can uniformly mix laser beams and reduce speckle noise of the laser beams without using a rod lens and a beam combiner.

Figure 4:
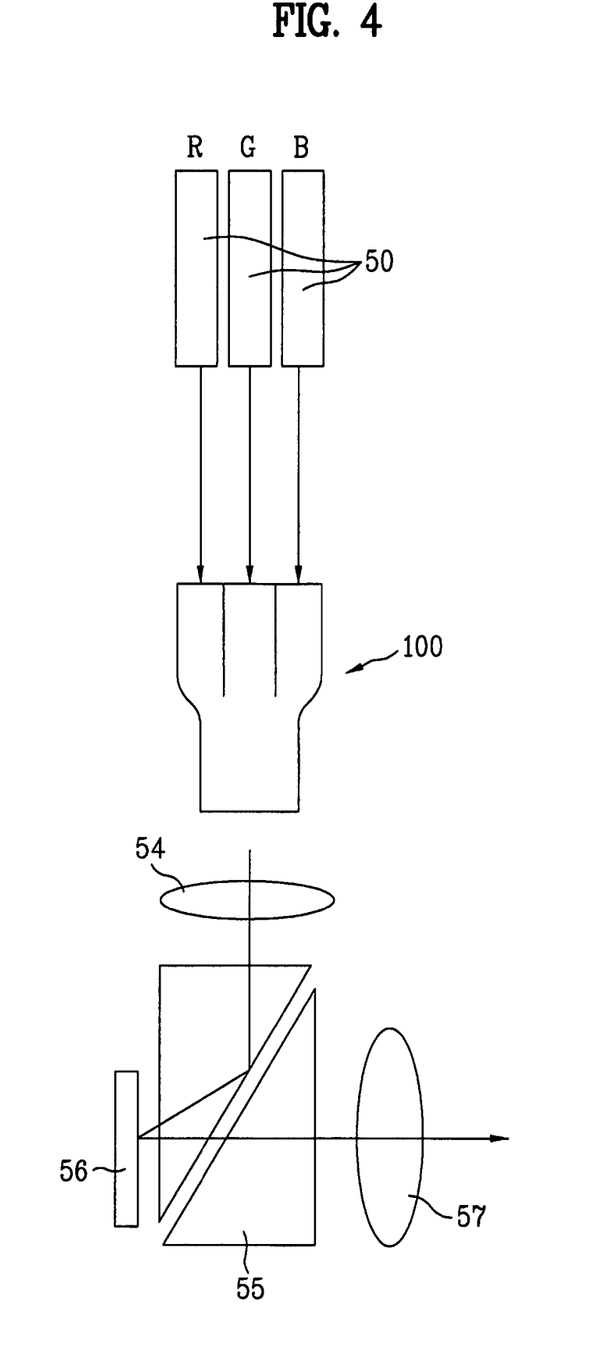
FIG. 4 is a schematic view of a first embodiment of a laser display device using an optical coupler of the present invention.

FIG. 4 is a schematic view of a laser display device using the above-described optical coupler 100. Red (R), green (G), and blue (B) beams output from R, G, and B lasers 50 are incident on the optical coupler 100. Here, a concentration lens for concentrating the beams output from the lasers 50 may be used.

In a conventional laser display device, laser beams are combined into white light through a beam combiner, and the white light is incident on a rod lens through a concentration lens. However, the above laser display device using the optical coupler 100 does not requires such a complicated construction.

The uniform light, obtained by the optical coupler 100, may be controlled by a lighting lens 54 so as to be irradiated onto a panel.

The light passed through the lighting lens 54 is incident on a total internal reflection (TIR) prism 55. The TIR prism 55 includes two prism blocks and a thin air layer provided between the two prism blocks, and serves to totally reflect light, when the incident angle of the light incident on an oblique plane is large, and to transmit light, when the incident angle of the light is small. The TIR prism 55 reflects light irradiated from the lighting lens 54 to a panel 56, and transmits signal light output from the panel 56.

The light incident on the panel 56 through the TIR prism 55 is expressed in images through an image signal of the panel 56. The signal light output from the panel 56 penetrates the TIR prism 55 and a projection lens 57, and forms an image displayed on a screen (not shown).

Such an optical coupler 100 may be applied to other type laser display devices.

The above-described optical coupler 100 may be located at any position between laser light sources and a scan mirror (not shown) in a scan type laser display device.

Second Embodiment

Figure 5:
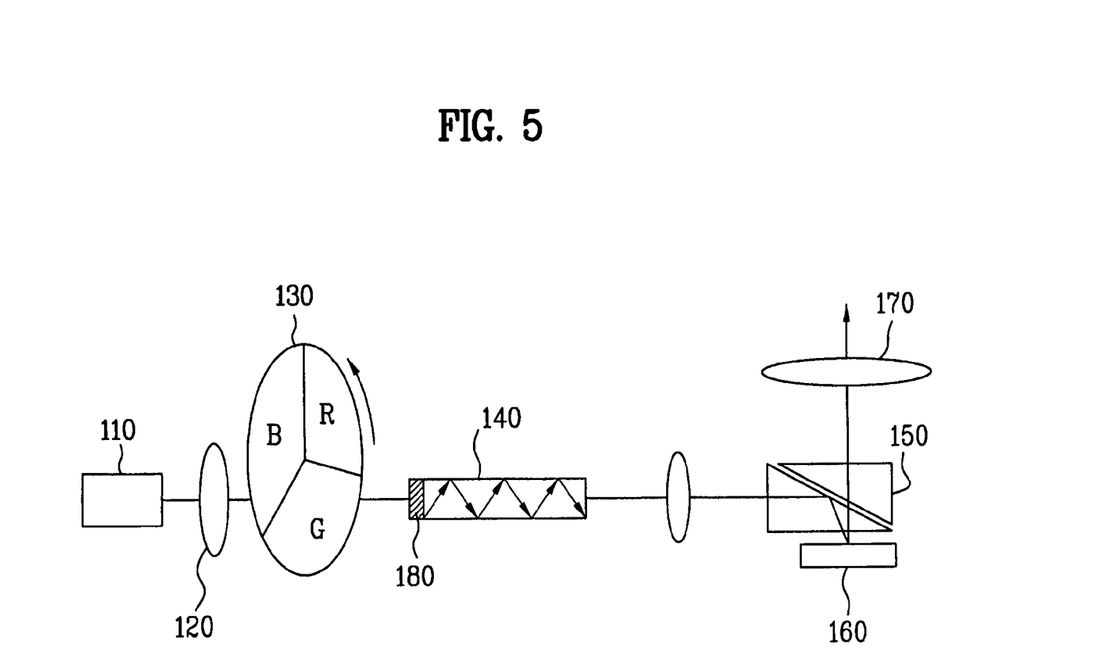
FIG. 5 is a schematic view of a second embodiment of the laser display device in accordance with the present invention.

As shown in FIG. 5, a laser display device includes a laser beam combination unit 110, a rotary color separation unit 130, an optical path unit 140, an image display unit 160, and a projection lens unit 170. The optical path unit 140 includes a speckle elimination unit 180 provided on an incident plane thereof.

The laser beam combination unit 110 combines laser beams having narrow wavelength regions into white light. For example, the laser beam combination unit 110 combines laser beams of red (R), green (G), and blue (B) into white light. The white light is concentrated by a concentration lens 120.

The concentrated white light passes through the rotary color separation unit 130, which includes a combination of filters for respectively passing beams of different wavelengths and is rotated at a high speed. The white light is separated into beams according to wavelengths by the rotary color separation unit 130.

For example, in case that the rotary color separation unit 130 includes a combination of filters for passing R, G, and B beams, the white light is sequentially separated into R, G, and B beams in process of time. The beams separated by the rotary color separation unit 130 are incident on the optical path unit 140.

Figure 6:
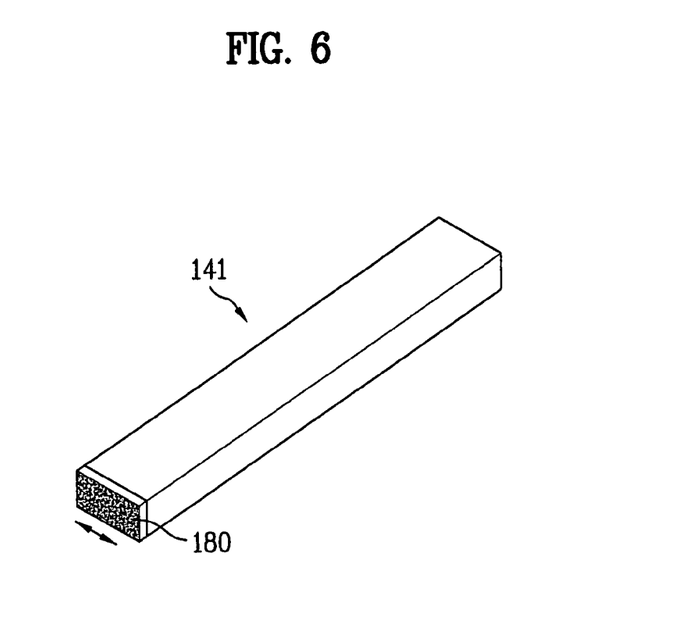
FIGS. 6 and 7 are perspective views illustrating a optical path unit.

As shown in FIG. 6, the optical path unit 140 includes a rod lens 141 made of bulky glass. The rod lens 141 is made of glass having a reflective index higher than that of air, thus achieving total reflection of light.

Figure 7:
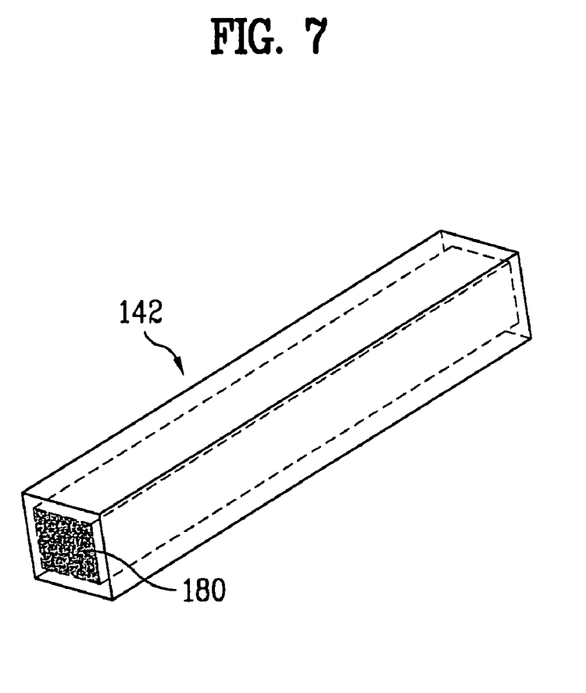

Otherwise, as shown in FIG. 7, the optical path unit 140 includes a light tunnel 142 having a hollow structure surrounded by mirrors. As shown in FIG. 7, the light tunnel 142 is formed by four mirror planes.

Here, the laser beams, which pass through the hollow of the light tunnel 142, are totally reflected by the mirror planes. That is, the laser beams, which pass through the optical path unit 140, are irregularly totally reflected in the optical path unit 140, and are uniformly mixed. Here, the speckle elimination unit 180 is provided on the incident plane of the optical path unit 140.

Figure 8A:
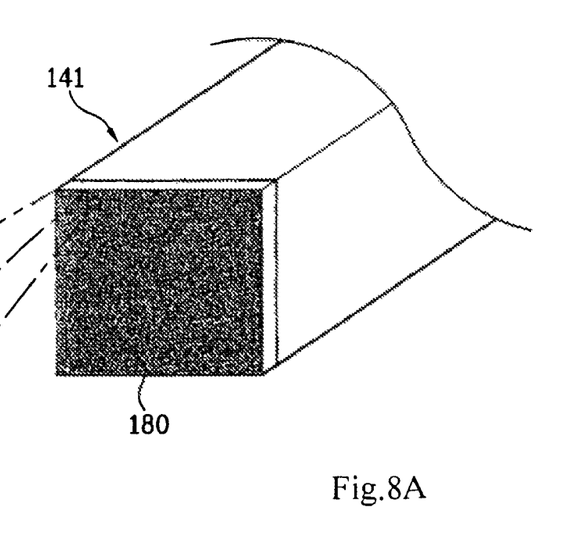
FIGS. 8A and 8B are a perspective view and a partial enlarged view of one example of a speckle elimination unit, respectively.
Figure 8B:
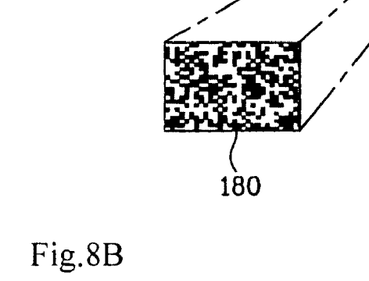

As shown in FIGS. 8A and 8B, the speckle elimination unit 180 uses a plate, on which an irregular pattern is disposed. Hereinafter, one example of a method for manufacturing the speckle elimination unit 180 will be described.

First, a two-dimensional random pattern, such as a hologram pattern by a computer, is formed. Then, a plate having a section including two layers corresponding to the random pattern is formed by a method, such as etching or molding.

That is, the speckle elimination unit 180, as shown in FIGS. 8A and 8B, has an uneven surface, which is expressed in black and white. For example, portions expressed in white denote depressed portions and portions expressed in black denote prominent portions. The speckle elimination unit 180 has a stratified structure corresponding to the random pattern.

The speckle elimination unit 180 is separately prepared, and is connected to the end of the rod lens 141 or the light tunnel 142. Since the amounts of the beams may be changed, it is preferable that the speckle elimination unit 180 is located behind the rotary color separation unit 130.

Further, in order to change the phases and the paths of the beams before the beams are uniformly mixed, the speckle elimination unit 180 may be provided on the incident plane of the optical path unit 140.

Preferably, the speckle elimination unit 180 is formed by directly etching or molding the section of the rod lens 141. Thereby, it is possible to eliminate speckles only using the optical path unit 140 without preparing any separate element.

Here, laser beams, which pass through the speckle elimination unit 180 having an uneven surface corresponding to the random pattern, have a phase difference. That is, the beams, which pass through the depressed portions and the prominent portions of the speckle elimination unit 180, have a phase difference due to a path difference, thus eliminating coherence.

Accordingly, it is possible to prevent the deterioration of image quality due to speckles, i.e., an interference fringe. Preferably, the depressed portions and the prominent portions have a height difference so that laser beams passing through the speckle eliminating unit have a phase difference of 180°.

The optical path unit 140 may further include a linear moving unit (not shown) for linearly reciprocating the speckle elimination unit 180 to generate the vibration of the speckle elimination unit 180. That is, as shown in FIG. 6, the optical path unit 140 is configured such that only the speckle elimination unit 180 can delicately linearly move. Further, when the speckle elimination unit 180 is formed integrally with the optical path unit 140, the optical path unit 140 is configured such that the optical path unit 140 can be delicately vibrated together with the vibration of the speckle elimination unit 180.

Preferably, the displacement of the linear moving unit (not shown) is as much as approximately one pixel of the irregular pattern formed on the plate of the speckle elimination unit 180. That is, the linear moving unit (not shown) has a displacement enough to delicately vibrate the speckle elimination unit 180.

Preferably, the linear moving unit (not shown) uses an electromagnetic element, which vibrates by an electric field, or a piezoelectric element, which expands and contracts by a piezoelectric effect and thus vibrates.

The laser beams, which are uniformly mixed, form an image on the image display unit 160. The image is projected and enlarged by the projection lens unit 170, and is displayed on a screen (not shown). Then, a user at the front of the screen (not shown) views the image displayed on the screen (not shown).

More specifically, the laser beams output from the optical path unit 140 are concentrated by a lighting lens, and are incident on a TIR prism 150.

The TIR prism 150 includes two prism blocks, which are bonded, and an air layer formed at the interface between the two prism blocks. The laser beams incident on the TIR prism 150 are totally reflected at an interface between the prism block having a high refractive index and the air layer having a low refractive index, and travel to the image display unit 160.

The image display unit 160 uses a reflective display element. For example, the image display unit 160 uses a digital micromirror device (DMD), in which micromirrors are disposed to form pixels.

In this case, the phases of the laser beams irradiated on the reflective display element are modulated according to corresponding image signals. Thereby, a correct color image is formed. Then, the image is enlarged by the projection lens unit 170 and is displayed on the screen (not shown).

Third Embodiment

Figure 9:
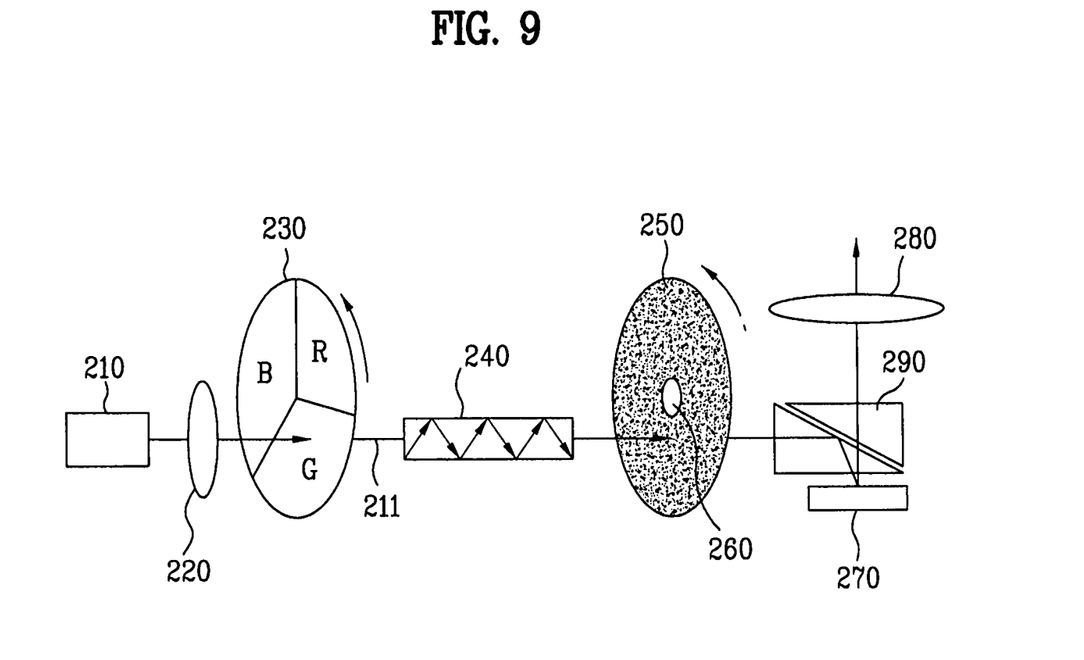
FIG. 9 is a schematic view of a third embodiment of the laser display apparatus in accordance with the present invention.

As shown in FIG. 9, a laser display device includes a laser beam combination unit 210, a rotary color separation unit 230, an optical path unit 240, a speckle elimination unit 250, an image display unit 270, and a projection lens unit 280.

The laser beam combination unit 210 combines laser beams having narrow wavelength regions into white light. For example, the laser beam combination unit 210 combines laser beams of red (R), green (G), and blue (B) into white light. If necessary, various light sources may be used.

The white light is concentrated by a concentration lens 220. The concentrated white light passes through the rotary color separation unit 230, which includes a combination of filters for respectively passing beams of different wavelengths and is rotated at a high speed.

The rotary color separation unit 230 separates the white light into beams according to wavelengths. For example, in case that the rotary color separation unit 230 includes a combination of filters for passing R, G, and B beams, the white light is sequentially separated into R, G, and B beams in process of time.

The beams separated by the rotary color separation unit 230 are incident on the optical path unit 240. The optical path unit 240 includes a rod lens made of bulky glass.

The rod lens made of glass having a reflective index higher than that of air, thus achieving total reflection of light. Otherwise, the optical path unit 240 includes a light tunnel having a hollow structure surrounded by mirrors.

That is, the light tunnel is formed by four mirror planes. The laser beams, which pass through the hollow of the light tunnel, are totally reflected by the mirror planes. That is, the laser beams, which pass through the optical path unit 240, are irregularly totally reflected in the optical path unit 240, and are uniformly mixed.

The mixed beams pass through the speckle elimination unit 250. The position of the speckle elimination unit 250 may be variously modified. The speckle elimination unit 250 may be located at any position from the laser beam combination unit 210 to the image display unit 270, in which the beams passed through the optical path unit 240 forms an image.

In case that the speckle elimination unit 250 is located at the laser beam combination unit 210 before laser beams of red (R), green (G), and blue (B) are combined, the speckle elimination unit 250 is prepared at each of light sources.

In case that the speckle elimination unit 250 is located at the image display unit 270 in which the beams passed through the optical path unit 240 forms an image, the speckle elimination unit 250 is preferably located on a Fourier transform (FT) plane of the projection lens unit 280, on which an image is embodied. Thereby, it is possible to eliminate speckles without damaging the image.

The speckle elimination unit 250 includes a plurality of panels, which is disposed perpendicularly to an optical axis 211 (an axis in a direction of traveling laser beams). At least one panel among the plurality of panels is movable. That is, at least one panel among the plurality of panels is movable horizontally or vertically, or is rotatable.

A rotational center 260, to which the plurality of panels is connected, is not collinear with the optical axis 211. That is, the rotational center 260 is eccentric from the optical axis 211. Thereby, laser beams traveling along the optical axis 211 pass through the plurality of panels of the speckle elimination unit 250.

Figure 10:
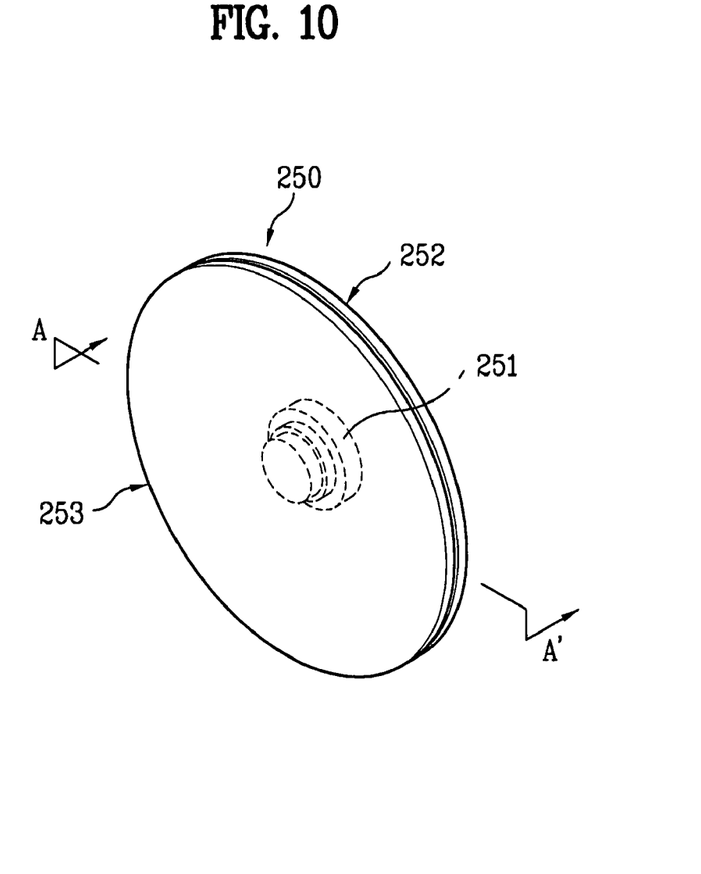
FIG. 10 is a perspective view of one example of a speckle elimination unit.

As shown in FIG. 10, one example of the speckle elimination unit 250 includes two panels, i.e., a first panel 252 and a second panel 253, which are disposed perpendicularly to the optical axis 211. The two panels 252 and 253 are spaced from each other by a regular interval, and are connected to each other through the rotational center 260.

Further, as shown in FIG. 10, a rotation driving unit 251 is provided in the rotational center, through which the two panels 252 and 253 are connected. The rotation driving unit 251, which includes a rotating motor, rotates at least one panel among the two panels 252 and 253.

Figure 11:
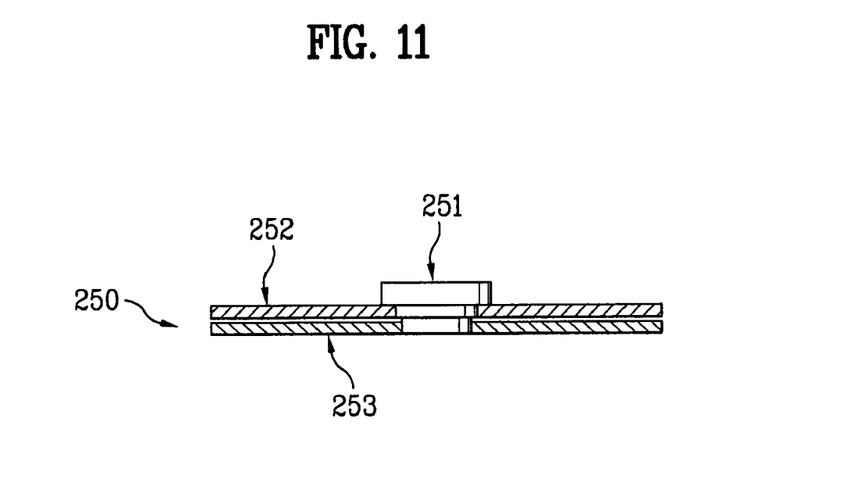
FIG. 11 is a sectional view of the speckle elimination unit, taken along the line A-A' of FIG. 10.

FIG. 11 is a sectional view of the speckle elimination unit 250, taken along the line A-A' of FIG. 10. As shown in FIG. 11, the first panel 252 is connected and fixed to a fixed body of the rotation driving unit 251, and the second panel 253 is rotatably connected to a rotational axis of the rotation driving unit 251. Thereby, when power is supplied to the rotation driving unit 251, the first panel 252 is fixed and only the second panel 253 is rotated.

Figure 12:
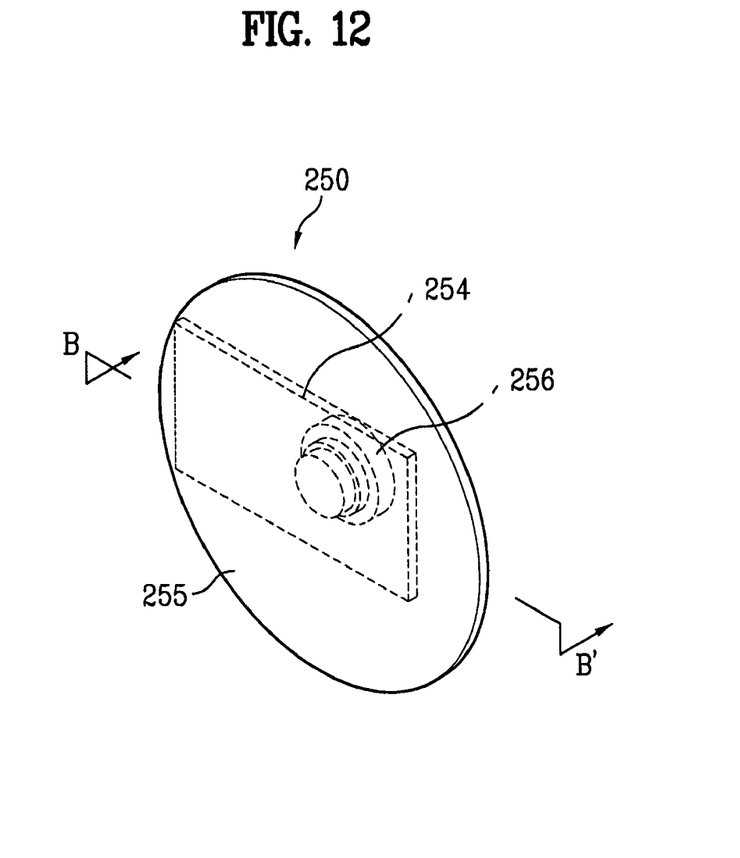
FIG. 12 is a perspective view of another example of the speckle elimination unit.

FIG. 12 is a perspective view of another example of the speckle elimination unit 250. As shown in FIG. 12, another example of the speckle elimination unit 250 includes two panels, i.e., a first panel 254 and a second panel 255, which are disposed perpendicularly to the optical axis. The two panels 254 and 255 are spaced from each other by a regular interval, and are connected to each other through the rotational center.

Figure 13:
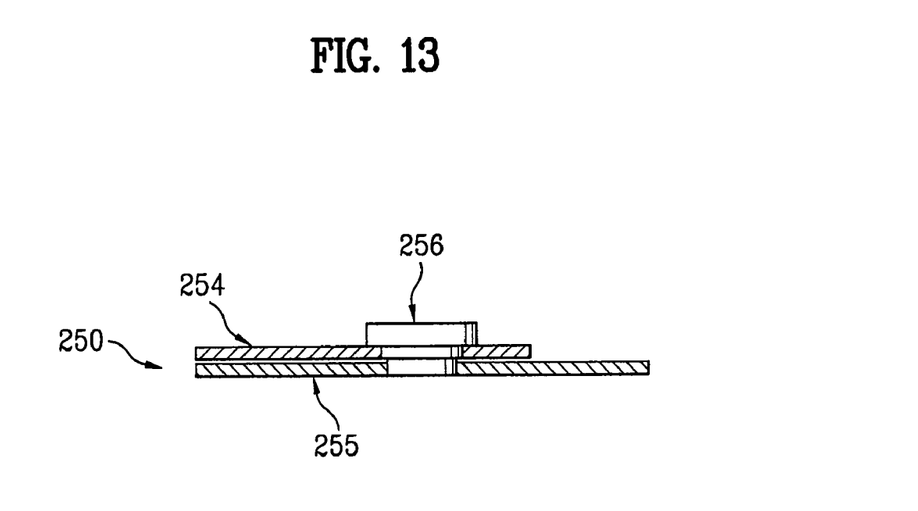
FIG. 13 is a sectional view of the speckle elimination unit, taken along the line B-B' of FIG. 12.

FIG. 13 is a sectional view of the speckle elimination unit 250, taken along the line B-B' of FIG. 12. As shown in FIG. 13, a rotation driving unit 256 is provided in the rotational center, through which the two panels 254 and 255 are connected, and rotates one panel among the two panels 254 and 255.

That is, the first panel 254 is connected and fixed to a fixed body of the rotation driving unit 256, and the second panel 255 is rotatably connected to a rotational axis of the rotation driving unit 256. Here, the first panel 254 is fixed, and is located only on an optical path, through which laser beams pass. That is, the size of the fixed first panel 254 is minimized so far as incident beams can pass through the two panels 254 and 255 of the speckle elimination unit 250.

Figure 14:
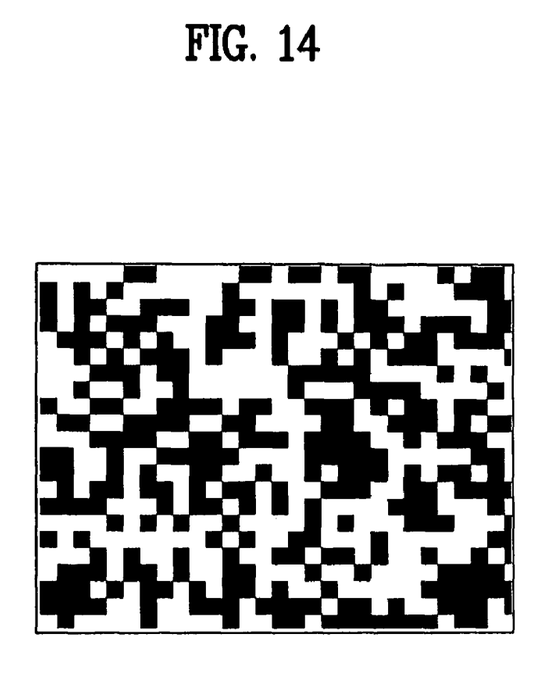
FIGS. 14 and 15 are a plane view and a sectional view of one panel of the speckle elimination unit provided with an uneven surface, respectively.

FIG. 14 schematically illustrates the surface of one panel of the speckle elimination unit. As shown in FIG. 14, a panel, which is provided with an irregular pattern formed thereon so as to have a dualistic layer, is used. Preferably, the dualistic irregular pattern is a hologram pattern made by a computer.

Figure 15:
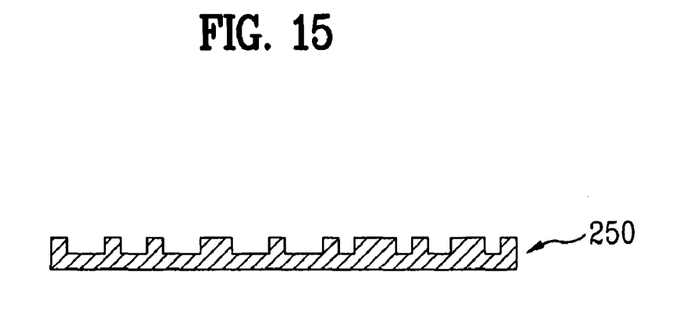

FIG. 15 is a sectional view of the panel of the speckle elimination unit. As shown in FIG. 15, the panel has a section including two layers corresponding to the above dualistic irregular pattern by etching or molding.

That is, the surface of the panel is expressed in black and white, as shown in FIG. 14, and is substantially uneven, as shown in FIG. 15. For example, portions expressed in white denote depressed portions and portions expressed in black denote prominent portions. The speckle elimination unit has a dualistic layer structure corresponding to the irregular pattern.

Laser beams, which pass through the speckle elimination unit having an uneven surface corresponding to the irregular pattern, has a phase difference. That is, the beams, which pass through the depressed portions and the prominent portions of the speckle elimination unit, have a phase difference due to a path difference, thus eliminating coherence.

Therefore, it is possible to prevent the deterioration of image quality due to speckles, i.e., an interference fringe. Preferably, the depressed portions and the prominent portions have a height difference so that laser beams passing through the speckle eliminating unit have a phase difference of 180°.

In case that a panel having an irregular uneven surface is used to generate a phase difference of incident beams, when a plurality of beam bundles is incident on one pixel, a speckle elimination effect may be lowered.

Accordingly, in this embodiment, the speckle elimination unit includes a plurality of panels, and is configured such that at least one panel among the plurality of panels can move linearly or rotate. Thereby, a plurality of beam bundles, which is incident on one pixel, is separated, thus having a phase difference.

The mixed laser beams having a phase difference form an image on the image display unit 270. The image is projected and enlarged by the projection lens unit 280, and is displayed on a screen (not shown). Then, a user at the front of the screen (not shown) views the image displayed on the screen (not shown).

As described above, the speckle elimination unit 250 may be located on a Fourier transform (FT) plane of the projection lens unit 280, on which the image is embodied.

Hereinafter, with reference to FIG. 9, the image formation will be described in detail.

The laser beams output from the optical path unit 240 are concentrated by a lighting lens, and are incident on a TIR prism 290. The TIR prism 290 includes two prism blocks, which are bonded, and an air layer formed at an interface between the two prism blocks. The laser beams incident on the TIR prism 290 are totally reflected at an interface between the prism block having a high refractive index and the air layer having a low refractive index, and travel to the image display unit 270.

The image display unit 270 uses a reflective display element. For example, the image display unit 270 uses a digital micromirror device (DMD), in which micromirrors are disposed to form pixels. In this case, the phases of the laser beams irradiated on the reflective display element are modulated according to corresponding image signals.

Thereby, a correct color image is formed. Then, the image is enlarged by the projection lens unit 280 and is displayed on the screen (not shown).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A laser display device comprising:
   light sources emitting laser beams;
   an image display unit displaying an image by the laser beams; and
   a speckle elimination unit located on a path of the laser beams, and including at least one panel having an uneven part and disposed on an optical axis of the light sources,
   wherein the speckle elimination unit includes a first panel and a second panel, which are disposed perpendicularly to the optical axis,
   wherein the first and second panels are spaced apart from each other by a regular interval, and are connected to each other through a rotational center,
   wherein a rotation driving unit is provided in the rotational center, through which the first and second panels are connected, the first panel is connected and fixed to a fixed body of the rotation driving unit, and the second panel is rotatably connected to a rotational axis of the rotation driving unit.

2. The laser display device according to claim 1, wherein the uneven part of the at least one panel has a dualistic layer structure corresponding to a random pattern.

3. The laser display device according to claim 2, wherein the laser beams passed through the at least one panel have a phase difference of 180° due to the dualistic layer structure.

4. The laser display device according to claim 2, wherein the random pattern includes dualistic pixels formed by a hologram.

5. The laser display device according to claim 1, the first panel is substantially a same surface area as that of the second panel.

6. The laser display device according to claim 1, a surface area of the first panel is different from a surface area of the second panel.

7. The laser display device according to claim 1, a surface area of the first panel is smaller than a surface area of the second panel.

8. A laser display device comprising:
   light sources generating laser beams;
   a laser beam combination unit combining laser beams;
   a color separation unit separating laser beams combined into R, G, and B laser beams;
   an optical path unit including a speckle elimination unit provided on an incident plane thereof, and uniformly mixing the R, G, and B laser beams; and
   an image display unit for displaying an image by the R, G, and B laser beams output from the optical path unit,
   wherein the speckle elimination unit is located between the color separation unit and the optical unit, and contacts with the incident plane of the optical path unit, through which the R, G, and B laser beams are inputted,
   wherein the optical path unit and the speckle elimination unit are integrated in a body, and make an alternating motion, simultaneously, through a linear moving unit, wherein the alternating motion is that the optical path unit and the speckle elimination unit move linearly on a plane perpendicular to an optical axis.

9. The laser display device according to claim 8, wherein the optical path unit is made of glass or is formed by mirror planes.

10. The laser display device according to claim 8, wherein the speckle elimination unit has a three-dimensional dualistic layer structure corresponding to a random pattern.

* * * * *